UNITED STATES PATENT OFFICE.

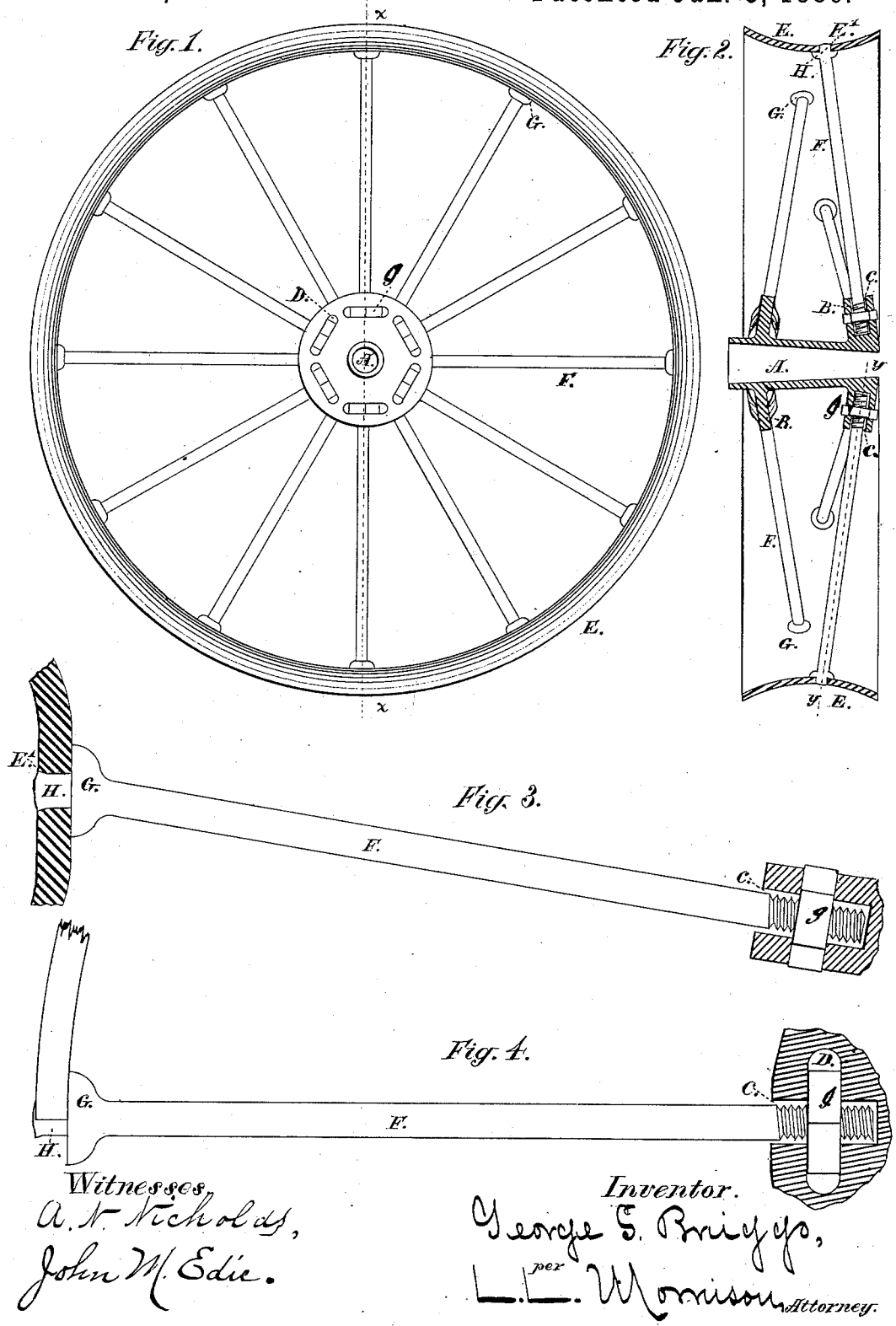

GEORGE S. BRIGGS, OF ROCKFORD, ILLINOIS.

CORN-PLANTER WHEEL.

SPECIFICATION forming part of Letters Patent No. 333,593, dated January 5, 1886.

Application filed June 1, 1885. Serial No. 167,165. (No model.)

*To all whom it may concern:*

Be it known that I, GEORGE S. BRIGGS, of Rockford, in the county of Winnebago and State of Illinois, have invented certain new and useful Improvements in Corn - Planter Wheels, of which the following is a specification.

My invention relates to that class of wheels which is constructed entirely of metal; and the objects of the invention are to furnish a strong durable wheel, the rim, hub, and spokes of which can be firmly secured together and readily adjusted to each other. I attain these objects by means of the combined parts illustrated in the accompanying drawings, in which—

Figure 1 represents a front view of an entire wheel. Fig. 2 represents a view of a transverse central vertical section of Fig. 1 through the dotted line $x\,x$. Fig. 3 represents a view of parts of Fig. 2. Fig. 4 represents a view of a spoke and a section of a part of Fig. 2 through the line $y\,y$.

Similar letters refer to similar parts throughout the several views.

A represents a wheel-hub.

B B represent circular flanges attached to or detached from the hub.

C C represent spoke-sockets sunk through the peripheral surfaces of the circular flanges B B.

D D represent slots cut through the circular flanges B B, the slots being preferably at right angles with the faces of the flanges.

E represents a concave wheel-rim.

E′ E′ represent mortises cut through the rim E at right angles therewith.

F F represent spokes having external screw-threads cut on their inner ends, and provided at their outer ends with the shoulders G G and the tenons H H, the latter being at right angles with the rim E.

I I represent nuts for regulating and holding in position the spokes F F.

To construct the wheel after the parts are completed, slip the nuts I I into the slots D D; turn the inner ends of the spokes F F through the nuts I I into the spoke-sockets C C until the tenons H H will pass into the mortises E′ E′; turn the nuts until the shoulders G G press firmly against the rim E and head the free ends of the tenons H H. The parts of the wheel can be expanded by forcing the spokes outward against the rim, or contracted by drawing the rim inward toward the hub, thereby combining both methods of tightening the parts of a wheel without turning the spokes about in their sockets.

What I claim is—

1. A wheel-hub having two flanges extending around the hub, the flanges being provided with transverse nut-slots and radial spoke-sockets, the latter being sunk below the nut-slots to receive the inner ends of spokes, as spoke - reserve for either expanding or contracting a wheel-rim.

2. A metallic wheel having the hub A, furnished with flanges B, the latter provided with transverse nut-slots D, and radial spoke-sockets C, extending below the nut-slots D, to receive the inner ends of the spokes F, as spoke-reserve for either expanding or contracting the wheel-rim E, the spokes F, the nuts I, and concave rim E.

GEO. S. BRIGGS.

Witnesses:
 FRANCIS L. VAN ARSDALE,
 CHARLES E. BRIGGS.